April 25, 1933.   C. S. SWAYZE   1,906,020
COIL TEST APPARATUS
Filed Nov. 29, 1929   5 Sheets-Sheet 3

Inventor
Clare S. Swayze
By Spencer Hardman & Fehr
his Attorneys

April 25, 1933.  C. S. SWAYZE  1,906,020
COIL TEST APPARATUS
Filed Nov. 29, 1929   5 Sheets-Sheet 4

Inventor
Clare S. Swayze
By Spencer, Hardman & Fehr
Attorneys

April 25, 1933.                C. S. SWAYZE                1,906,020
COIL TEST APPARATUS
Filed Nov. 29, 1929                 5 Sheets-Sheet 5

Inventor
Clare S. Swayze
Spencer, Hardman & Fehr
his Attorneys

Patented Apr. 25, 1933

1,906,020

UNITED STATES PATENT OFFICE

CLARE S. SWAYZE, OF ANDERSON, INDIANA, ASSIGNOR TO DELCO-REMY CORPORATION, OF ANDERSON, INDIANA, A CORPORATION OF DELAWARE

COIL TEST APPARATUS

Application filed November 29, 1929. Serial No. 410,448.

This invention relates to apparatus for testing electrical coils and is particularly adaptable to the testing of ignition coils used in automotive vehicles.

One of the objects of the instant invention is to place the coil, after manufacture thereof has been completed under extreme tests whereby the efficiency of its operation may be determined.

Another object of this invention is to determine a defective coil after it has left the assembly line of manufacture.

Another object of the instant invention is to apply specific tests to a completed coil assembly, that are material to its efficient operation.

Further objects and advantages of the present invention will be apparent from the following description, reference being had to the accompanying drawings wherein a preferred embodiment of one form of the present invention is clearly shown.

In the drawings:

Fig. 11 is a diagrammatic view of the electrical circuit pertaining to the coil conditioning apparatus.

Fig. 12 is a diagrammatic illustration of the electrical circuit running throughout the endurance test rack.

Figure 1:
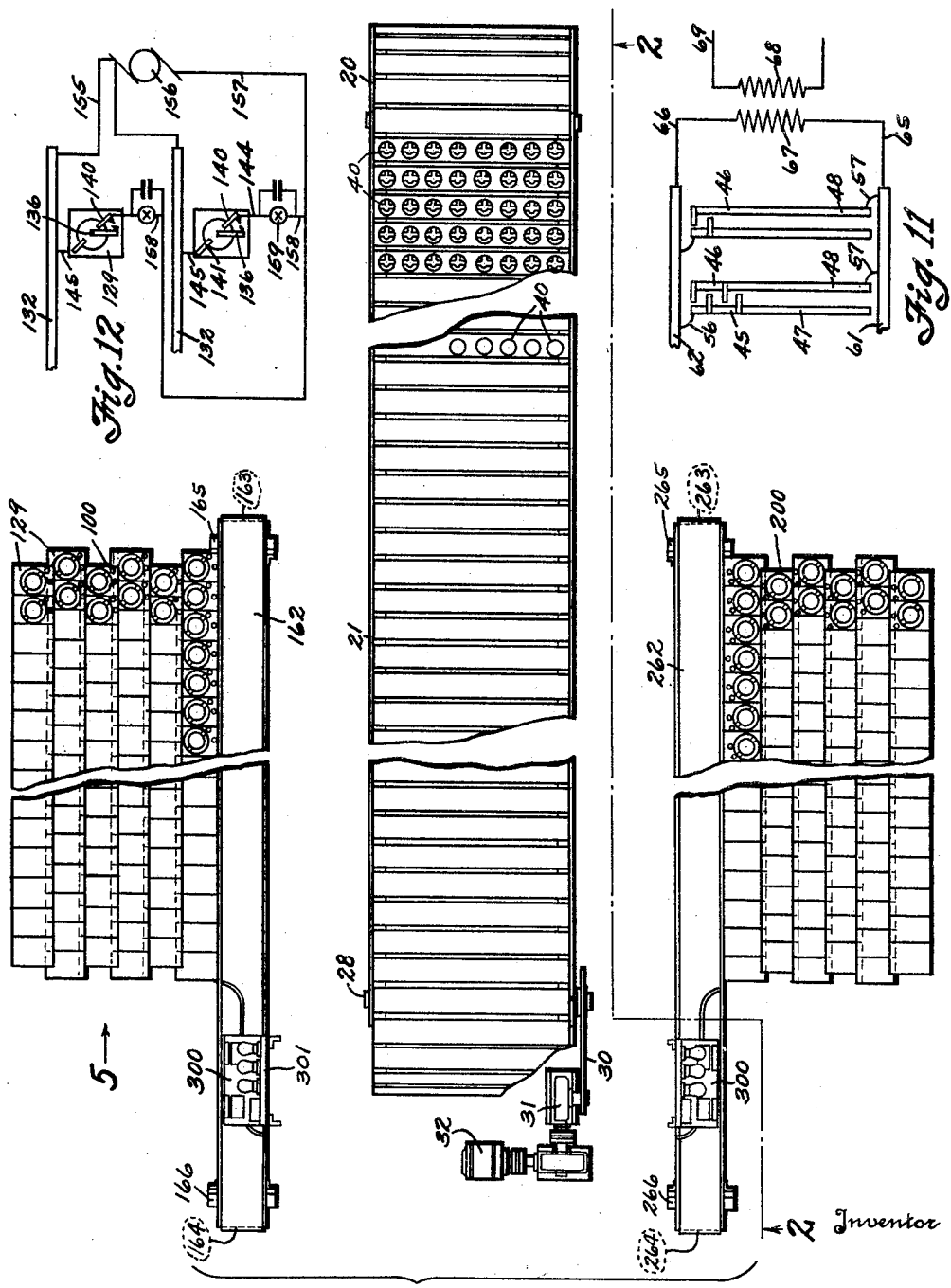
Fig. 1 is a plan view of my improved means for preparing and testing electrical coils in accordance with the invention.

With particular reference to the drawings, Fig. 1 illustrates the layout of the test apparatus, and in main includes a heat-run or coil conditioning unit 20, disposed between a pair of endurance test racks 100 and 200, each of which supports a circuit test fixture 300 as will later be described.

The heat-run unit 20 includes a belt-like conveyor 21 comprising a pair of conveyor chains 22 maintained in spaced relation by conveyor slats 23, the said conveyor being carried by angle bars 24 forming part of a frame work fixed to posts 25 supporting sprockets 26 and 27 over which is trained the conveyor 21. The sprockets 27 are drivingly connected to a shaft 28 to which is fixed a sprocket 29 connected by a driving element 30, as a belt or chain, to a gear reduction mechanism 31, in turn drivingly connected to a motor 32. The sprockets 26 are provided with a shaft 33 journalled in blocks 34 adjustably supported in hangers 35 by the end posts 25 of the frame. The frame supporting the heat-run conveyor is otherwise strengthened and braced by means of the cross members 36, angles 37 and diagonals 38.

Figure 3:
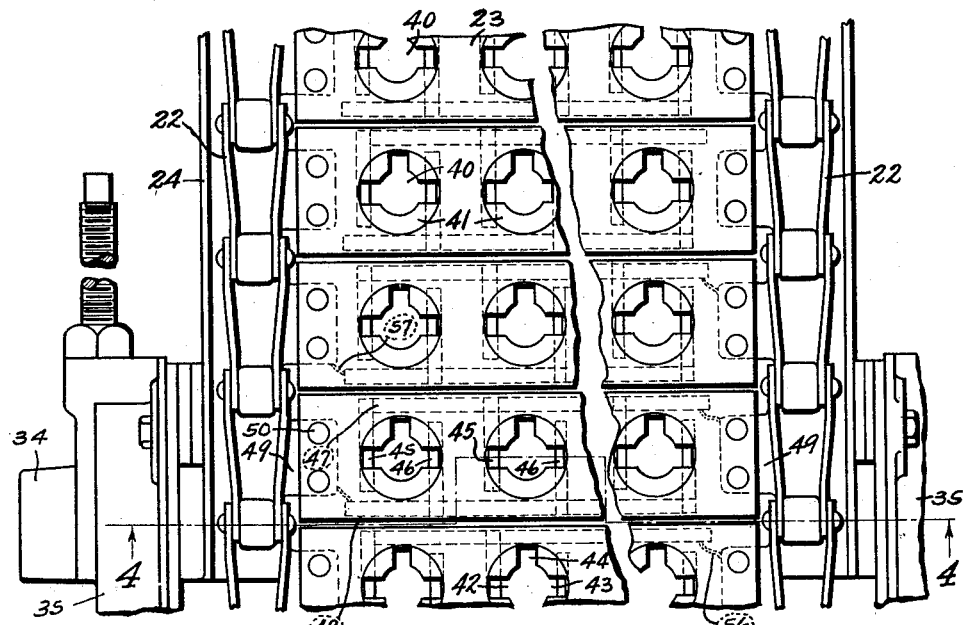
Fig. 3 is an enlarged detail in fragmentary showing of the coil conditioning apparatus.

The object of the heat-run unit is to provide the coils to be tested and maintain them at a high temperature condition, in order that the coils may be tested under the extremes of conditions to which they are likely to be subjected in actual operation upon a motor vehicle. In practice this is accomplished by constructing the conveyor of considerable length and making provision with each of slats 23 thereof for receiving the coils to be tested in a manner that they may be heated during transportation by the conveyor. The slats 23 therefore, are provided with receptacles or coil receiving portions 40 which constitute T-shaped apertures through the said slats 23, and are of the general formation as exhibited in Figs. 3 and 4. In main, there is an enlarged countersink 41 which is pierced by the lateral extensions 42, 43 and 44 of the aperture through the slat so as to provide recesses for the terminal post of the coil to be tested. It will be observed that the lateral extensions 42 and 43 are situated at substantially diametric points of the aperture, and are provided at the bottom thereof with contact members 45 and 46 respectively, that are connected with conductor strips 47 and 48 respectively, all of which are supported on the slats 23 of the conveyor.

The slats 23 as before stated are supported by the links 22 of the parallel chain, and this is accomplished by providing each of the links with an attaching lug 49 which may be secured to the slats by rivets 50. The lugs 49 also support brackets 51 securing fiber or nonconducting blocks 52. The blocks 52 act as contact carrying members for a copper brush 53 that is secured to a brush bracket 54 and tension device 55, the brush 53 having electrical connection with one or the other of the connector strips 47 and 48 through a pigtail connection 56 or 57 attached to the clip 58.

Figure 2:
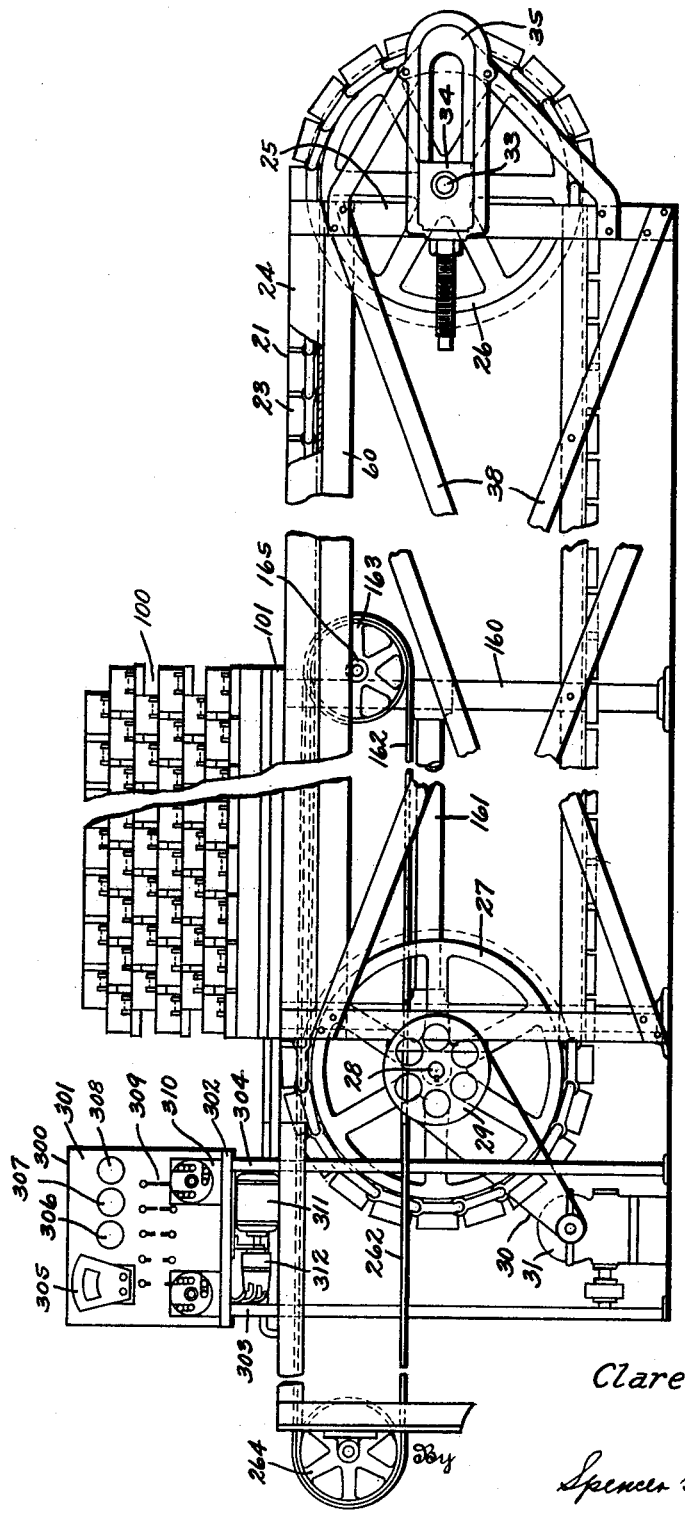
Fig. 2 is a longitudinal sectional view of the coil testing means substantially as indicated by the line and arrows 2—2 of Fig. 1, illustrating certain parts thereof in elevation.
Figure 4:
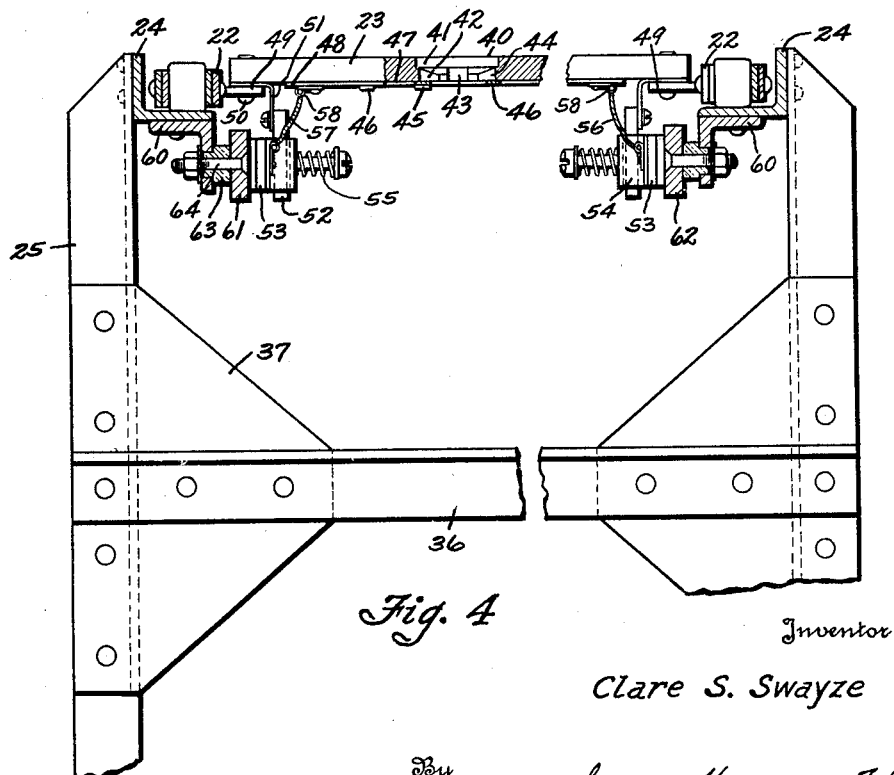
Fig. 4 is a vertical cross section therethrough substantially as indicated by the line and arrows 4—4 of Fig. 3.

The angle bars 24 of the conveyor tracks support angle bars 60 on which are insulatingly mounted bus-bars 61 and 62 that are normally engaged by the brushes 53 of the conveyor belt. Nonconducting spacer 63 and bolt 64 act to secure the bus-bars in proper position. In practice, the bus-bars 61 and 62 are provided only along the top lap of the conveyor substantially as illustrated in Figs. 2 and 4, and it will be noted by reference to Fig. 4 that the bus-bars 61 and 62 each contact with one or the other of the brush assemblies carried by the conveyor slat while it travels along the top course of the conveyor. It will be noted further, that all of the contact members 45 of all of the slats 23 are connected by the strips 47 of the respective slat with the bus-bars 62, whereas the contact members 46 and strips 48 are connected with the bus-bars 61. This means provides a series of parallel conductors throughout the mechanism, and so presents the contact members 45 and 46 of each coil receiving aperture that an electrical circuit will be completed as soon as a conducting element of whatsoever kind is placed across the members 45 and 46, thus providing means for electrical connections of coils directly that they are placed within the receptacles 40 with the terminals of the coil engaging the strips 45 and 46. A coil may be placed in any one of the receptacles while the slats are on the upper course of the conveyor and an electrical connection will be made therethrough so long as energy is supplied to the bus-bars 61 and 62.

Fig. 11 diagrammatically illustrates a circuit connection through the coil conditioning apparatus, where the bus-bar 61 is connected to each of the conductor strips 48 by the pigtails 57, each of the strips in turn connected with the contact members 46 of the respective slat, and the bus-bar 62 likewise connected with the strips 47 and contacts 45 by the pigtails 56. The bus-bars are connected with a source as by the conductors 65 and 66, and a winding 67 of a transformer having a second winding 68 connected into the line of service 69.

The heat run unit just described is so proportioned in magnitude, and is driven at such a speed that the coils to be tested when placed upon the conveyor 21 at the right hand end thereof, as illustrated in Fig. 1, that they will be heated to a considerably higher temperature and maintained thereat by the time they have reached the left hand end of the conveyor. The time required for this conveyor travel in order to present the coils to be tested at the most satisfactory temperatures will vary somewhat with the size or style or specific internal dimensions of the coils to be tested, but in main the speed of the conveyor is so timed, and the characteristics of the energy traversing the bus-bars 61 and 62 are so proportioned, that the internal structure of the coil will be relatively hot by the time that it is presented opposite of the endurance racks 100 and 200.

Each of the test racks 100 and 200 are essentially the same in construction and the detailed description of the one will therefore suffice for a description of the other, and it is to be kept in mind that the reference characters 200 and those immediately following will designate parts of the second rack that are identical with parts numbered 100 and immediately following of the first rack. With this in mind, the endurance test rack 100 provides the base or bed member 101 affixed with a front rail 102 and uprights 104. Hinged to the uprights is an inclined supporting platform carried by inclined stringers 105 and corner braces 106 and rigidly secured to rear uprights 107. This provides substantially triangular frame work and housing within which are mounted banks of circuit breakers 108, 109, 110 on ledges or bases 111.

Each bank of the circuit breakers is provided with a common cam shaft 112 operating to open and close circuits through the circuit breakers in a manner prescribed by the usual automotive ignition circuit breaker, and each of the circuit breakers is provided with a collecting terminal 113 to which a lead may be attached for a purpose that will presently appear. A single power device may be connected to each of the shafts 112 so that all of the banks of distributors may be driven in unison. Upon the nonconducting bases 111, along each bank of circuit breakers there is fixed bus-bars 114, each having leads 115 connecting the bus-bars to terminals 116 of each of the circuit breakers. This triangular frame is shielded on the back side or along the uprights 107, by a fiber or nonconducting wall 117 attached to the frame work, and the inclined portion is provided with an auxiliary base including a nonconducting fiber board 118 hinged to the frame at 119 and supported between the end stringers 105 of the framework in any preferred manner. This framework supporting the fiber base 118 forms a convenient enclosure or lid over the banks of circuit breakers heretofore described, and yet admits of ready access being had thereto when it is desired for inspection or repair of the mechanism.

Figures 5, 6:
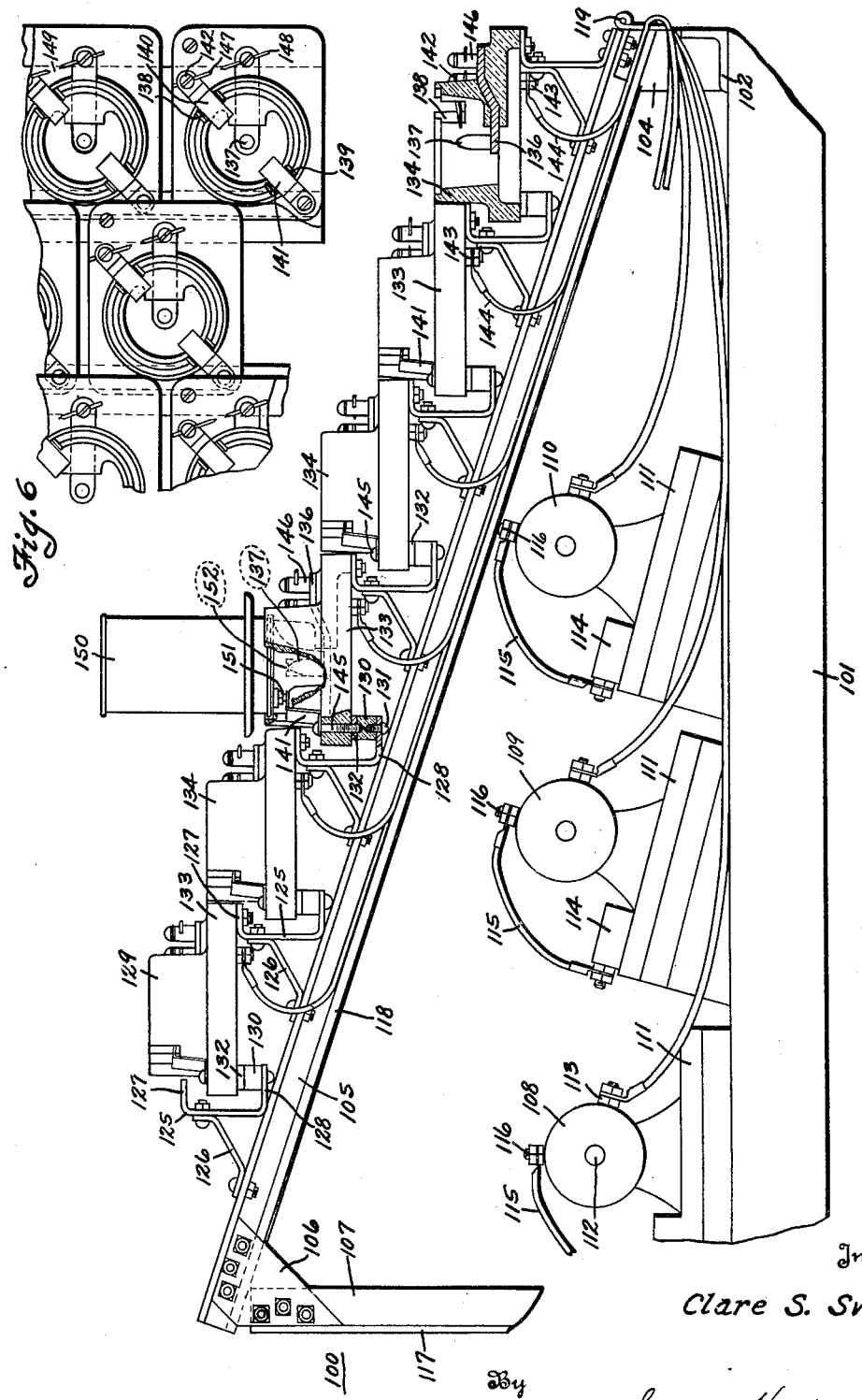
Fig. 5 is a view in end elevation of the endurance test rack, with portions thereof broken away and shown in section for the purpose of illustrating details of construction.
Fig. 6 is a fragmentary plan view of a portion of the endurance test rack, being in substance a projection of elements represented in Fig. 5.
Figure 7:
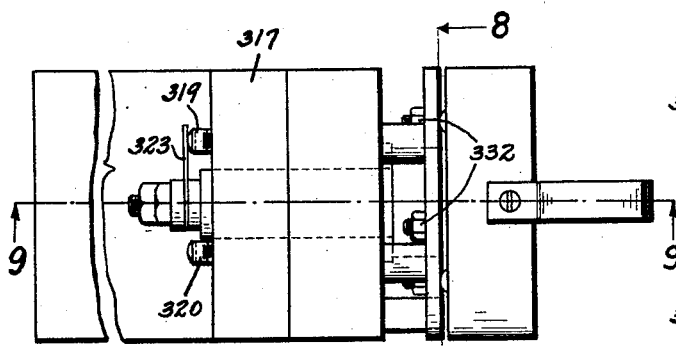
Fig. 7 is a plan view of a test block used in conjunction with one of the units of the apparatus.

On the incline table formed by the board 118 and its framework there is mounted a plurality of ledges carrying coil receiving members so as to present the coils being tested in tier formation, admitting of convenient access and proper observation. These ledges or shelves in main comprise channel members 125 secured at their ends to the stringers 105 in any convenient manner and are rigidly braced by the members 126 as illustrated in Fig. 5. Each of the channels 125 provide the flanges 127 and 128 which afford convenient mounting means for coil receiving cup units 129. The flanges 128 support a fiber strip 130 by means of screws 131 to which strip may be secured the copper bus-bar 132, the strips 130 and 132 acting also as spacers between the ledge 128 and a base 133 of the coil receiving unit 129, so as to provide a substantially level support for the member 129 when it is mounted upon the bus-bar 132 and a flange 127 of an adjacent channel member 125.

The coil receiving members 129, in the instant shown, are units complete in themselves and are formed of nonconducting material molded into the form exhibited in Figs. 5 and 6, and to provide the following appointments. To the base portion 133 there is an integral formation defining a cylindrical shell 134 of sufficient size to receive the end of an ignition coil which is to be tested, and this shell substantially defines an aperture through the member 129 as will be seen by reference to Figs. 5 and 6. In the formation of the member 129 a metallic conductor or insert 136 providing a terminal post 137 at a point concentric with the aperture therethrough is secured in the body of the member as illustrated in Fig. 5.

At diametrically opposite points the shell 134 is provided with notches 138 and 139 for the reception of a spring conductor or contact member 140 and 141 respectively; the contact members 140 being secured in place by a binding post 142 which provides a terminal connection 143 adapted for reception of an insulated lead 144 connected with the terminal post 113 of a distributor of one of the banks 108, 109 and 110. The contact member 141 is secured to the base 133 of the coil receiving member and makes electrical connection with the bus-bar 132 by means of screws 145, and by means of a common connector attached to each of the bus-bars 132 is led to a proper source of energy. The conductor 136 which is moldably secured within the coil receiving member, supports exterior of the shell 134 a binding post 146, and it will be observed upon reference to Fig. 6 that the binding post 146 is relatively close in juxtaposition to the post 142. These posts each carry a pin or rod 147 and 148 respectively and which are adjustable within the binding posts 142 and 146, whereby the proximity of their converging points may be varied so as to provide a spark gap 149 of desired magnitude.

This structure provides means for receiving an electrical coil 150 that is to be tested, whereby the terminals 151 of the coil when placed in the cup in inverted position within the member 129 will engage the contact members 140 or 141 as the case may be, and so that the secondary terminal 152 of the coil will make engagement with the post 137 at the center of the coil receiving member. Fig. 12 illustrates the electrical circuit of this endurance test apparatus and depicts the bus-bars 132 joined by lead 155 with a source of energy as the magneto generator 156, and with a return lead 157 connected by one or more branches 158 with distributors 159, which are in turn connected by leads 144 with the terminals 140, while the terminals 141 are connected by the elements 145 to the bus-bars 132. The conductor element 136 is diagrammatically illustrated as projecting to the central point of the coil receiving member 129 and presenting the sparking gap 149 as earlier described.

In the operation of this endurance test rack the coils to be tested are placed in inverted form in the coil receiving member 129 as illustrated about the middle of Fig. 5, so that the terminal members thereof engage the contact elements 137, 140 and 141 of the coil receiving member, which automatically makes electrical connection with the windings through the coil as they normally exist while the coil is assembled with the automotive vehicle for operation. Directly that the coil is placed in this position in the coil receiving member, the primary winding therethrough will be energized by reason of the current from the source 156 traversing the circuit earlier described through the contact elements 140 and 141 and the interposed winding of the coil being tested. The terminals of the secondary winding are automatically connected with the elements 140 and 137 when the coil is placed within the receptacle 129 and thereby the binding posts 142 and 146 with their converging rods 147 and 148 simulate the spark gap of the plug within the automotive engine and will, upon energization of the primary winding, if the coil is in proper condition and correctly oriented with respect to the receiving member, manifest in the sparking or flashing at the gap 149.

It will be recalled that the coils have been prepared by reason of the heat-run test earlier described, so that they are of relatively high internal temperature condition by the time they are presented opposite of the endurance test racks. The coils to be tested while in this condition are deposited within the receptacles 129 where they remain for a predetermined length of time being necessary for an adequate test. The coils being in a high internal temperature condition are manifestly under the most critical conditions for successful operation and are more likely to break down or fail in operation altogether, or to function only poorly, as compared with the conditions under lower temperature at which the coils are usually called upon to operate. The endurance of the coils that are being tested is determined from the nature of the spark of flash that is manifest at the gap 149, whether or not the sparking or flashing is manifest at the gap, and if it manifests whether or not it continues throughout the period of time that the coil remains on the rack, and its characteristic manifestation at the termination of the test being administered.

Each of the endurance test racks 100 and 200 is mounted upon a suitable stand that it may be of a convenient level with the coil conditioning apparatus hereinbefore described, and that stand may include the stand pipes or pedestals 160 braced by the horizontal member 161 to support the bed member 101. On the forward edge of the endurance rack 100 which may be supported by the table or frame supporting the same there is provided a belt conveyor 162 draped over pulleys 163 and 164, the said pulleys being journalled in bearings 165 and 166 respectively fixed to the framework, as a post 160 and 167. It will be observed that the conveyors 162 and 262 extend the entire length of the test racks 100 and 200 and sufficiently beyond the left hand portions thereof as illustrated in Fig. 1, to and beyond a circuit test fixture 300.

Each of the circuit test fixtures is identical in structure and arrangement, and the description of one will suffice for both. The structure comprises in main a panel 301 having a ledge or shelf 302 and supported by standards or posts 303 and 304 secured to the frame of the conveyor 162 and 262 respectively. The panel 301 has affixed thereon, circuit indicating means as a volt meter 305, lamps 306, 307 and 308 and a series of spark gaps 309. The shelf or base 302 is provided with one or more coil test blocks 310 and supports underneath thereof, a small motor 311 drivingly connected to a circuit breaker and distributor mechanism 312. The electrical connections of these elements is diagrammatically illustrated in Fig. 13 of the drawings and will be described in detail subsequent to the specific description of the coil test block 310, which now follows.

Figure 8:
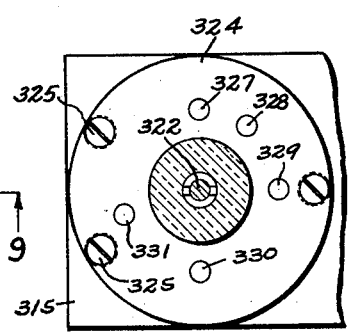
Fig. 8 is a section through the test block substantially as indicated by the line and arrows 8—8 of Fig. 7.

The coil test block is illustrated in detail in Figs. 7 to 10 inclusive, and comprises an angular member 313 having a horizontal leg for attaching or support upon the ledge 302 and a vertical portion 315 apertured to receive a nonconducting bearing 316. Affixed to one side of the leg 315 is a nonconducting block 317 secured by screws 318 and providing switch terminals 319 and 320. The block 317 is recessed to receive the head of the bearing 316 and provides a bore therethrough in continuation of the bore through the sleeve 316. In this bore there is journalled an oscillatable coil receiving member 321 of nonconducting material and supporting an electrical conductor 322 provided with a switch arm 323 for cooperation with the terminals 319 and 320. Between the oscillatable member 321 and the leg 315 of the angular member there is a switch terminal plate 324 secured by screws 325 and spaced from the member 315 by the sleeves 326. The plan of the terminal supporting plate 324 is illustrated in Fig. 8, and provides the contact members 327, 328, 329, 330 and 331 each of which terminates in the space between the members 315 and 324 in conductor terminals 332, to which various electrical leads are connected as will be explained later with reference to Fig. 13.

Figure 9:
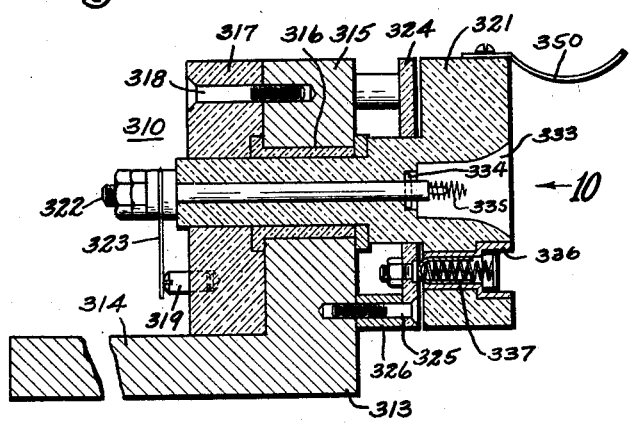
Fig. 9 is a longitudinal section through the test block substantially as indicated by the line and arrows 9—9 of Fig. 7.

The oscillatable member 321 is provided with an aperture or recess 333 coaxial with the conductor rod 322 and of sufficient depth that the conductor rod may project into the center thereof as illustrated in Fig. 9. A cross pin 334 secures the conductor member within the block 321 and a spring 335 is provided at the end thereof supplying a yieldable contact member for the high tension terminal of an ignition coil presented thereto for test. At points concentrically arranged about the conductor rod 322, the oscillatable member 321 is provided with recesses securing tubular inserts 336 forming a guide for a spring receiving cup 337. Projecting into each of the inserts 336 there are resilient or yieldable contact members 338, 339 and 340, one end of which is secured to the member 321 by screws 341, while the free end of each of the contact members is disposed over one or another of the spring receiving cups 337. A spring 342 disposed in the cup and beneath the free end of the respective contact member urges the spring receiving cup 337 into engagement with the terminal supporting plate 324.

The fixed contacts 327 to 331 inclusive and the spring receiving cups 337 are situated on arcs of equal radius from the axis of rotation of the member 321, therefore when the member 321 is rotated or oscillated the spring receiving cups 337 will be caused to engage or disengage one or more of the contacts of the terminal supporting plate 324. Hence, by a predetermined extent of rotation of the member 321 the various ones of the spring receiving cups 337 will be connected with the desired ones of the fixed contacts upon the plate 324. The member 321 is permissible of limited rotation or oscillation and is urged toward a normal position or that position illustrated in Figs. 7, 9 and 10 by a spring 345 secured to the angle member 313 at 346, and to the member 321 by a screw 347, and suitable stop means are provided for resisting further oscillation of the member 321 by the spring 345 and may consist of the screws or abutments 348 and 349. The member 321 carries a fourth terminal conductor in the form of a leaf spring 350 which is designed to contact the metallic case about the coil to be tested when it is presented to the oscillatable member 321.

Figure 13:
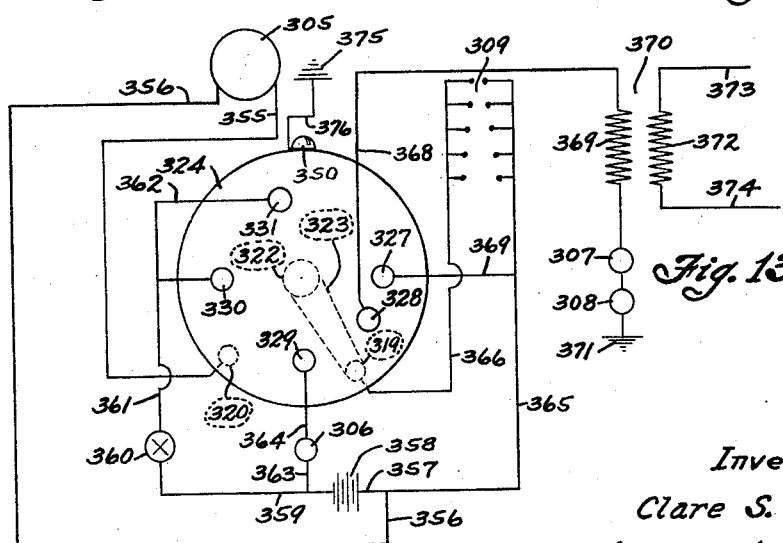
Fig. 13 is a diagrammatic illustration of the electrical circuit through the coil test apparatus.

The electrical connections of the circuit test apparatus are fully illustrated in Fig. 13 as has been earlier stated, and includes the volt meter 305 having a conductor 355 connecting one terminal thereof with the switch post 320, and a second conductor 356 connecting with a terminal 357 of a battery 358 from which is led a conductor 359 to one terminal of a circuit breaker 360, and from a second terminal of the circuit breaker, a lead 361 communicates with the terminal member 330 supported by the plate 324, and the terminal member 330 is in electrical engagement with the terminal 331 by a conductor 362. Electrically connected with the lead 359 is a conductor 363 running to one terminal of the lamp 306 and thence by lead 364 to the terminal member 329 supported by the plate 324. The conductor 356 also has a connection with the series of spark gaps 309 by means of a conductor 365, and from thence by a conductor 366 from the opposing element of the spark gap to the second switch terminal 319. A branch conductor 369 joining the conductor 365 leads to the terminal 327. A conductor 368 communicates with the terminal member 328 of the plate 324 and leads to a winding 369 of a transformer 370, and thence to the indicator lamps 307 and 308 which are finally grounded at 371. A cooperating winding 372 of the transformer 370 is connected to the service line conductors 373 and 374 in the usual manner. The spring conductor 350 is provided with a ground connection 375 by a conductor 376.

As before stated the oscillatable member is permissible of movement to a plurality of positions. In the immediate instance the contacting mechanism between the member 321 and the terminal plate 324 is designed to distribute the various circuit tests that are to be administered, into one or another of three distinct positions. In the first position, which is that position taken by the elements of the test block as exhibited in Figs. 7 to 10 inclusive, tests are made upon the coil, running to the strength of the coil whether or not the internal connections of the coil are correct, and if the coil is of the lock switch type whether or not the switch is in proper association with the coil.

Figure 10:
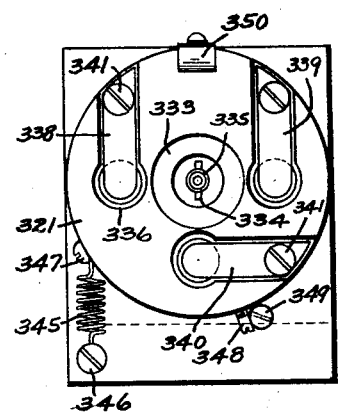
Fig. 10 is a front elevation of the test block substantially as illustrated by the arrow 10 in Fig. 9.

In this first position of test the member 321 will be disposed relative to the terminal plate 324 as illustrated in Figs. 9 and 10, in which the contact member 338 will be in engagement with the terminal 330, the contact member 339 in engagement with the terminal 337, and the contact member 340 in electrical engagement with the terminal 329. By reference to the diagram in Fig. 13, it will now be seen that when the coil being tested is presented to the member 321, so that the high tension terminal thereof is in engagement with the spring contact 335, and that the timer, battery and gas gage terminals of the coil are in engagement with the contact members 338, 339 and 340 respectively, that, assuming the internal connections of the coil to be complete and correct, circuits will be completed through the test block apparatus and manifest in the various signal devices upon the panel 301.

The internal structure of the coil is such, that when applied to the member 321, that the primary winding thereof will be in electrical communication with the contact elements 338 and 339, and that the secondary winding thereof will be in electrical communication with the spring contact 335 and the contact 339, while the gas gage terminal will have electrical communication between the contact elements 339 and 340, thus the contact element 339 is a common connector for the three main circuits through the coil. Now keeping this in mind and applying the same to Fig. 13 of the drawings, it will be observed that the timer terminal of the coil will have connection with the battery or source 358 through the connections 327, conductors 369, 365, 357, 359, circuit breaker 360, conductor 361 and terminal 330. This primary circuit being complete will result in the induction of current through the secondary winding of the coil, which is connected across the terminal 327 to the rod 322, and if complete with its connection of the switch arm 323, switch post 319, conductor 366, spark gap 309 and conductor 369 leading to the terminal 327, will manifest in the flashing exhibit at the gap 309. The magnitude or the character of the sparking or flashing at the gap 309 will be indicative of the strength of the coil. That is, a strong sparking across all of the points of the gap will indicate the coil is of maximum efficiency and is a strong one, while irregular sparking across all of the points but one or more, will indicate the relative strength or the weakness of the coil and will amount to an eliminating factor for that coil.

Thus, the strength of the coil has been determined and also the correctness of the internal connections of the coil, for, were the connections in the coil windings incorrect there would be no spark manifestations at the gap 309. Test of the auxiliary circuit through the coil, or that connecting the gas gage terminal with the battery terminal as across the terminals 327 and 329 of the member 321, is indicated by the lighting of the lamp 306 which is connected to the terminal 329 by the conductor 364, and to the battery 358 by the conductors 363 and 359. From the battery the circuit is completed through the conductors 357, 365 and 369 to the terminal 327, and it is therefore seen that if the internal connection of the coil is proper, the fact will be so indicated by the lamp 306.

In coils of the lock switch type, an additional test may be made at this point or in the first position, in that determination can be made as to whether the switch structure is correct, and whether it is properly associated with the circuits through the coil. Manipulation of the lock member to off and on position, if the connections are proper, will optionally control a manifestation of the test indicating means 306 and 309.

For the second position of test, while the coil is still applied to the block 321, the assembly is oscillated or rotated in a clockwise direction as viewed from Figs. 10 and 13, to the position in which, the contact member 339 will be in engagement with the terminal 328, and in which the spring conductor 350 will establish a ground connection with the conductor 376. In this second position a single test is administered in order to determine whether or not the secondary winding of the coil is grounded. Should the secondary winding be grounded to the can or case enclosing the coil, a circuit would then be completed by the secondary winding through the terminal 328, the conductor 368, the winding 369 of the transformer 370, the indicating lamps 308 and 307, the ground connections 371 and 375, the conductor 376, contact strip 350, and by way of the can enclosing the coil back through the secondary winding. Thus, grounding of the secondary winding will be indicated by lighting of the lamps 307 and 308.

The test administered at this point is rather a critical one, in that the transformer 370 is designed such as to produce a 500 volt current through the winding 369, and thus when lead through the coil will subject the winding thereof to extremes of current demand in access of what it would be called upon in the normal operation upon a motor vehicle. If the coil will not break down under these tests it surely will stand the current to which it will be subjected upon the vehicle. The test here administered either eliminates or determines one of the possible failures that may result in the absence of the manifestation in the gap 309 during the first position of the test.

In a third position of test, the coil is still retained in its presentation in the block 321, and the entire assembly is moved to a third position by continuing the clockwise rotation with respect to Fig. 10 at which a test is administered for determining whether or not the secondary winding is open. In this third position the contact element 338 will be in electrical engagement with the terminal 331, and the high tension terminal of the coil will be in engagement with the spring contact 335 which by way of the switch arm 323 will be in electrical communication with the switch post 320. Now, assuming the secondary winding of the coil to be complete or closed, a circuit will be completed through it and the primary winding, with which for this purpose it is serially connected, to the terminal 331 and thence by conductors 362, 361 circuit breaker 360, 359, battery 358, conductor 356, volt meter 305 and conductor 355, to the switch terminal 320, and thence back by the way of the switch arm 323 and rod 322 to the high tension terminal 335 and the secondary winding. If the circuit through the secondary is complete, the fact will be designated by deflection of the indicator of the volt meter 305, and an absence of this deflection will indicate that the circuit is open.

In practice, the tests administered by this apparatus can be determined through a very short interval of time. It is only necessary to present the coil being tested to the fixtures 321 whereupon the test being made in position one may be determined. A weak or poor sparking at the gap 309 will place the operator upon his guard as to the indicia to be sought in the test of the other two positions. Immediately he turns the fixture to the third position, which necessarily passes through the second position, and if the secondary circuit is grounded that will be manifest by the flashing of the lamps 307 and 308 as the member is oscillated through the second position to the third. Absence of any manifestation by the lamps 307 and 308 further informs the operator that the fault may be due to an open secondary, which test is administered in the third position, and indicated upon the volt meter 305. Should it there be indicated that the winding of the secondary is in closed circuit then it is obviously manifest that the fault or failure of the coil resides in the winding of the primary.

The tests administered by the endurance rack, and by the circuit test fixture are so correlated as to administer both a low speed test and a high speed test, in that the spark impulses to which the coils are subjected in the endurance test are of the low speed type which are generated about 520 R. P. M. at 60 cycles, while during the circuit tests the high speed type of spark impulses are produced which are generated at about 1750 R. P. M. at 60 cycles. The coils are therefore subjected to both low and high speed firing conditions. Thus it is seen that the coils throughout all of the tests to which they are subjected are examined under extremes of conditions beyond which they are not likely to be subjected during operation upon a motor vehicle. The coils that withstand the tests are capable of and assured of efficient and continued operation in service. The coils that fail to withstand the tests may be either discarded altogether or reclaimed, depending upon the nature of the failure. The nature of the failure is adequately determined by the test apparatus herein described and furnishes the manufacturer of the coil a ready index as to the practicability of salvaging the coil, and as to what must necessarily be done in order to reclaim it.

While the form of embodiment of the present invention as herein disclosed, constitutes a preferred form, it is to be understood that other forms might be adopted, all coming within the scope of the claims which follow.

What is claimed is as follows:

1. The method of testing electrical coils comprising, the acts of heating said coils to a determinable temperature, and maintaining said coils in a preferred temperature condition for a specified time, subjecting the coils under the existing temperature conditions to an endurance test, and finally examining the condition of circuits through the coils while in the specified temperature condition.

2. The method of testing electrical coils comprising, the acts of establishing and maintaining the coils to be tested under preferred high temperature conditions, and subjecting said coils to endurance tests and circuit tests while in said high temperature condition.

3. The method of testing electrical coils comprising, the acts of heating the coil to a preferred high temperature condition, subjecting the coil to an endurance test while in said high temperature condition, and determining the condition of circuits through said coil immediately at the termination of said endurance test and while in said high temperature condition.

4. In apparatus for testing electrical coils, a heat-run unit comprising, a belt conveyor, slats on said conveyor, each providing a plurality of receptacles for the coils to be tested, means for locating the coils in the receptacles in a predetermined position relative thereto, a pair of electrical contacts provided for each receptacle so as to make engagement with the terminals of an electric coil when properly located therein, said conveyor having provision for electrical energization of said contact and coil throughout a predetermined portion of the travel of said conveyor.

5. In apparatus for testing electrical coils, a heat-run unit comprising in combination, a frame providing a conveyor track and a pair of bus-bars in parallel relation thereto, a conveyor disposed within the track, and provided with slats each supporting a brush carrier in engagement with one of said bus-bars, each of said slats providing receptacles for the coil units to be tested, and presenting electrical contacts each having communication with one of said bus-bars, whereby when a coil to be tested is deposited within said receptacle it will be heated to high temperature condition for a predetermined portion of travel over said conveyor.

6. In apparatus for testing electrical coils, an endurance test rack comprising in combination, a bed plate supporting a plurality of circuit breakers, a rack supporting a plurality of coil cups, electrical connections in each of said coil cups having communication with the said circuit breakers, and with the frame supporting the same, whereby electrical circuits through said coil are made coincident with disposition of the coils within said cups.

7. In apparatus for testing electrical coils, an endurance test rack comprising in combination, a frame supporting a plurality of circuit breakers, and an equal number of coil receiving members, each of said coil receiving members providing an electrical connection for each of said coil terminals within the receiving member, and an indicating means without the same, said electrical connections and indicating means having electrical communication with a circuit breaker and the frame work supporting the same, whereby proper electrical connections will be completed with circuits through said coils when properly disposed within the receptacles, manifesting in a signal through said indicating means.

8. In apparatus for testing electrical coils, including an endurance rack, a coil receiving member therefor, comprising, a dielectric member for receiving the coils to be tested, providing a plurality of electrical contacts and a test indicating means for cooperation with certain parts of the coils to be tested, the coil when inserted therein automatically making the proper connection with the contact elements thereof, whereby the results of the test being administered will be manifest at the indicating means.

9. In a circuit test fixture for determining the condition of electrical circuits through an ignition coil, the combination comprising, a panel providing a ledge, an oscillatable coil receiving member supported on said ledge and test indicating means supported by the panel, said coil receiving member providing electrical communication between the coil being tested and the test indicating means, said coil receiving means being oscillatable to a plurality of positions for determining various circuit conditions through said coil.

10. In a circuit test fixture of the class described, the combination comprising, a mounting panel providing a plurality of test indicating means, a coil receiving member oscillatably supported by said panel, and periodic circuit closing means having electrical communication with said coil receiving member and said test indicating means, whereby one or more of said test indicating means will be caused to function upon presentation of a coil to said receiving member and manipulation of the same.

11. The combination set forth in claim 10 in which, said coil receiving member provides a plurality of contact members for cooperation with the several terminals of the coil to be tested, and in which said coil receiving member is oscillatable to a plurality of positions in which the conditions of one or more circuits through said coil may be determined.

12. The combination set forth in claim 10 in which, tests are made for the strength of the coil, and for the internal connections of the coil at one position of the oscillatable member, grounding of a winding of the coil at a second position of the oscillatable member, and a test for an open circuit through one of the windings of the coil at a third position of said oscillatable member, the results of the test being indicated by the respective test indicating means supported by said panel.

13. In a test fixture of the class described, the combination comprising, a base and an oscillatable coil receiving member mounted thereon, said oscillatable member providing a plurality of contact members adapted for engagement with the terminals and metal casing of the coil to be tested, said coil receiving member being oscillatable to a plurality of positions for completing predetermined circuits through said coil being tested.

14. In a test fixture of the class described, the combination comprising, a base and an oscillatable coil receiving member mounted thereon, said oscillatable member providing a plurality of contact members adapted for engagement with the terminals and metal casing of the coil to be tested, said coil receiving member being oscillatable to a plurality of positions for completing predetermined circuits through said coil being tested, means electrically connected with each of said contact members, whereby the condition of circuit through said coil being tested will determine the strength of the coil, the state of the internal connections of the windings, grounding of one or more of the windings of the coil, and open circuits through the windings of the coil.

15. In apparatus for testing electrical coils, a heat-run unit comprising, a belt conveyor; slats on said conveyor, each providing a plurality of receptacles for locating the coils to be tested in a predetermined position relative to the receptacles; a pair of electrical contacts provided for each receptacle so as to make engagement with the terminals of an electric coil only when properly located therein, said conveyor having provisions for electrical energization of said contact and coil throughout a predetermined portion of the travel of said conveyor.

In testimony whereof I hereto affix my signature.

CLARE S. SWAYZE.